United States Patent [19]

Onishi et al.

[11] Patent Number: 5,153,060
[45] Date of Patent: Oct. 6, 1992

[54] RESIN COMPOSITION FOR ADHERING POLYARYLENE SULFIDE AND POLYVINYLIDENE FLUORIDE, METHOD OF ADHERING THEM AND THEIR LAMINATED STRUCTURE

[75] Inventors: Shunji Onishi, Tsukuba; Yoshinori Ichikawa, Fujisawa; Junji Takeuchi, Kamakura, all of Japan

[73] Assignee: Tonen Sekiyukagaku Kabushiki Kaisha, Tokyo, Japan

[21] Appl. No.: 683,649

[22] Filed: Apr. 11, 1991

Related U.S. Application Data

[62] Division of Ser. No. 425,630, Oct. 23, 1989, Pat. No. 5,091,463.

[30] Foreign Application Priority Data

Oct. 28, 1988 [JP] Japan ................. 63-272430

[51] Int. Cl.$^5$ .................. B32B 5/16; B32B 27/08
[52] U.S. Cl. .................. 428/323; 427/374.1; 427/374.4; 428/421
[58] Field of Search ............. 428/421, 419, 323; 523/203; 525/185, 189; 524/404, 430, 502, 503, 508; 427/374.1, 374.4

[56] References Cited

U.S. PATENT DOCUMENTS

| | | | |
|---|---|---|---|
| 4,026,863 | 5/1977 | Iseki et al. | 523/203 |
| 4,212,923 | 7/1980 | Brady | 428/419 |
| 4,395,512 | 7/1983 | Kubota et al. | 524/413 |
| 4,748,077 | 5/1988 | Skinner et al. | 428/224 |
| 4,795,671 | 1/1989 | Shiiki et al. | 428/419 X |
| 4,943,473 | 7/1990 | Sahatjian et al. | 428/421 X |

FOREIGN PATENT DOCUMENTS 0252669  1/1988  European Pat. Off. .

OTHER PUBLICATIONS

Japanese Patent Abstract, #84-091846, Great Britain of JP 59-38927 (Mar. 3, 1984).

*Primary Examiner*—Thomas J. Herbert, Jr.
*Attorney, Agent, or Firm*—Armstrong, Nikaido, Marmelstein, Kubovcik & Murray

[57] ABSTRACT

A resin composition comprising polyarylene sulfide, polyvinylidene fluoride and optionally ultrafine particles and a method of adhering a polyarylene sulfide article and a polyvinylidene fluoride article by using a resin composition comprising polyarylene sulfide, polyvinylidene fluoride and optionally ultrafine particles as an adhesive comprises the steps of melting portions of the polyarylene sulfide article and the polyvinylidene fluoride article to be adhered and the adhesive at a temperature between a melting point of the polyarylene sulfide and 400° C.; bringing the portions to be adhered into contact with each other via the adhesive in a molten state; and cooling the adhered portions in a contact state.

5 Claims, 1 Drawing Sheet

RESIN COMPOSITION FOR ADHERING POLYARYLENE SULFIDE AND POLYVINYLIDENE FLUORIDE, METHOD OF ADHERING THEM AND THEIR LAMINATED STRUCTURE

This is a division of application Ser. No. 425,630 filed Oct. 23, 1989, now U.S. Pat. No. 5,091,463.

BACKGROUND OF THE INVENTION

The present invention relates to a resin composition comprising, as main components, polyarylene sulfide and polyvinylidene fluoride, a method of adhering a polyarylene sulfide article and a polyvinylidene fluoride article by using such a resin composition as an adhesive, and a laminated structure produced by such an adhering method.

Polyvinylidene fluoride (hereinafter referred to as "PVDF") is a resin having excellent chemical resistance, softness, weathering resistance, slidability, electric properties, contamination resistance, etc. but having poor adhesion properties, and polyarylene sulfide (hereinafter referred to as "PAS") is a resin having a high melting point and elasticity, and excellent heat resistance and chemical resistance but poor resistance to ultraviolet rays. Accordingly, it is expected to bond the above two resins together to provide composite articles having combinations of good properties, but there is no known adhesive capable of bonding the two resins.

OBJECT AND SUMMARY OF THE INVENTION

An object of the present invention is to provide an adhesive capable of bonding PAS and PVDF.

Another object of the present invention is to provide a method of adhering PAS and PVDF.

A further object of the present invention is to provide a laminated structure of PAS and PVDF.

As a result of intense research in view of the above objects, it has been found that a resin composition comprising PVDF and PAS in a particular proportion which may further contain ultrafine particles of inorganic materials is highly effective as an adhesive for PAS and PVDF. The present invention is based upon this finding.

The resin composition according to one embodiment of the present invention comprises polyarylene sulfide, polyvinylidene fluoride and ultrafine particles.

The resin composition according to another embodiment of the present invention comprises polyarylene sulfide and polyvinylidene fluoride in a polyvinylidene fluoride/polyarylene sulfide ratio of 5-35 volume %.

The method of adhering PAS and PVDF according to a further embodiment of the present invention comprises the steps of providing a resin composition comprising polyarylene sulfide, polyvinylidene fluoride and ultrafine particles as an adhesive; melting portions of said polyarylene sulfide article and said polyvinylidene fluoride article to be adhered and said adhesive at a temperature between a melting point of said polyarylene sulfide and 400° C.; bringing said portions to be adhered into contact with each other via said adhesive in a molten state; and cooling the adhered portions in a contact state.

The method of adhering PAS and PVDF according to a still further embodiment of the present invention comprises the steps of providing a resin composition comprising polyarylene sulfide and polyvinylidene fluoride in a polyvinylidene fluoride/polyarylene sulfide ratio of 5-35 volume % as an adhesive; melting portions of said polyarylene sulfide article and said polyvinylidene fluoride article to be adhered and said adhesive at a temperature between a melting point of said polyarylene sulfide and 400° C.; bringing said portions to be adhered into contact with each other via said adhesive in a molten state; and cooling the adhered portions in a contact state.

The laminated structure according to a still further embodiment of the present invention comprises PAS and PVDF adhered to each other via an adhesive layer composed of a resin composition comprising polyarylene sulfide, polyvinylidene fluoride and ultrafine particles.

The laminated structure according to a still further embodiment of the present invention is PAS and PVDF adhered to each other via an adhesive layer composed of a resin composition comprising polyarylene sulfide and polyvinylidene fluoride in a polyvinylidene fluoride/polyarylene sulfide ratio of 5-35 volume % as an adhesive.

DETAILED DESCRIPTION OF THE INVENTION

Figure 1:
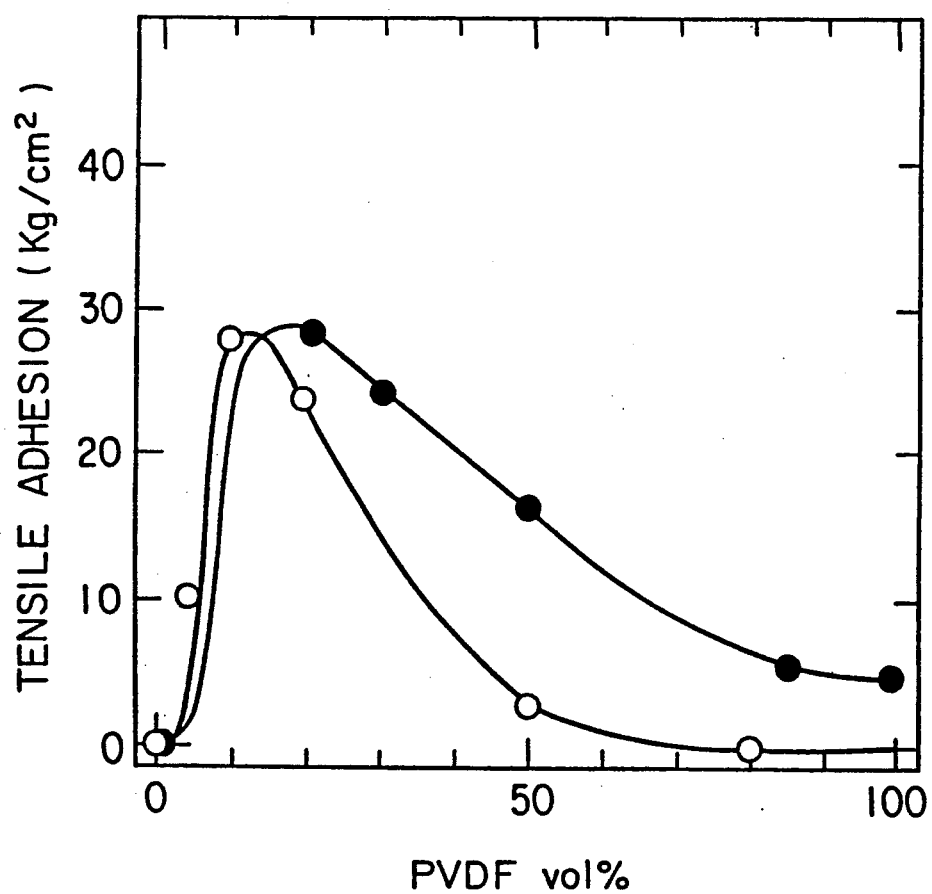
FIG. 1 is a graph showing the relations between tensile adhesion and a PVDF ratio (volume %) when a polyphenylene sulfide article and a polyvinylidene fluoride article are adhered.

Polyarylene sulfide (PAS) which may be used in the present invention is a polymer having a molecular structure represented by the following general formula:

wherein "—Ar—" is a divalent aromatic group represented by the following formula:

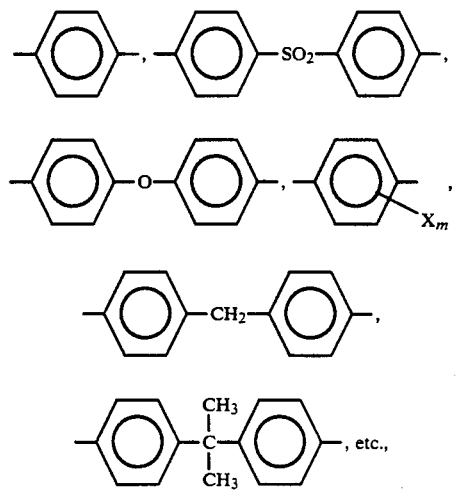

wherein X denotes F, Cl, Br, $CH_3$, etc., and m denotes an integer of 1-4.

A typical polyarylene sulfide resin is polyphenylene sulfide (PPS) having a repeating unit represented by the general formula:

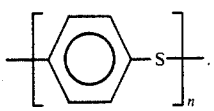

The polyarylene sulfide (PAS) generally has a melt viscosity at 300° C. of 100–10000 poise. The preferred melt viscosity of PAS is 500–5000 poise.

Incidentally, polyphenylene sulfides are commercially available as an injection-molding grade, an extrusion grade, etc. Such polyphenylene sulfides include "Tohpren PPS" (manufactured by Tohpren Co., Ltd.), "Polyphenylene Sulfide" (manufactured by Asahi Glass Co., Ltd.), "Shin-Etsu PPS" (manufactured by Shin-Etsu Chemical Co., Ltd.), "Susteel" (manufactured by Hodogaya Chemical Co., Ltd.), etc.

PVDF which may be used in the present invention is a polymer having a molecular structure represented by the following formula:

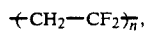

The polyvinylidene fluoride (PVDF) generally has a melt index (230° C., 10 kg/cm$^2$, ASTM D 1238) of 1–100. The preferred melt index of PVDF is 4–50.

PVDFs having the above molecular structure may be an injection-molding grade, an extrusion grade, etc. Such PVDFs include "KF Polymer" (manufactured by Kureha Chemical Industries, Ltd.), "Neofron VDF" (manufactured by Daikin Industries, Ltd.), "SOLEF" (manufactured by Solvay, Belgium), etc.

The ultrafine particles which may be used in the present invention should be those stable chemically and morphologically in the melt blending of PAS and PVDF. The ultrafine particles have an average particle size of 10 μm or less, preferably 0.01–1 μm. Such ultrafine particles include various types of iron oxide and chromium oxide powder for magnetic recording media, metal powder produced by vacuum vapor deposition, glass powder, ceramic powder such as aluminium oxide powder, boron nitride powder, silicon oxide powder, etc., fly ash, etc.

The adhesive resin composition having the above formulation can be produced by melt blending of PAS, PVDF and ultrafine particles, and this adhesive resin composition can be heat-pressed to provide a sheet-like adhesive.

In the blending of components, it should be taken into consideration that the ultrafine particles may show extremely different specific gravities depending upon their types, and that the PVDF copolymer shows a specific gravity from 1.76 to about 2 depending upon a mixing ratio of constituent monomers, for instance, vinylidene fluoride and ethylene tetrafluoride. PAS also shows different specific gravities, depending upon its grade. Accordingly, the formulations of the components are herein expressed by volume % instead of weight %. A mixing ratio of polyvinylidene fluoride to polyarylene sulfide is simply called a PVDF ratio herein, which is defined as follows:

PVDF ratio =

PVDF volume/(PVDF volume + PAS volume) × 100%

The filling ratio of the ultrafine particles is simply expressed by the following formula:

Filling ratio =

Ultrafine particle volume/(Ultrafine particle volume +

PVDF volume + PAS volume) × 100%

The PAS volume and the PVDF volume are true volumes as macromolecular compounds.

In the case of adhering PAS and PVDF, the adhesive consisting essentially of PAS and PVDF shows good adhesion properties when the PVDF ratio is 5–35 volume %, preferably 7–25 volume %. In this case, an adhesion strength of about 25 $kgcm^2$ or more can be achieved.

In the case of the adhesive comprising PAS, PVDF and the ultrafine particles, the adhesive shows good adhesion properties even when the PVDF ratio is 100%, but excellent adhesion can be obtained when the PVDF ratio is 7–65%.

With respect to a mixing temperature and an adhesion temperature, they should be temperatures, at which both PAS and PVDF can be melted. For instance, PAS has a melting point of about 282° C., and PVDF has a melting point of about 165° C. and starts to be thermally decomposed at a temperature higher than about 340° C. Accordingly, the mixing and bonding temperature is preferably in the range of about 290°–340° C., more preferably 305°–340° C., although it may vary within this range depending upon the types of PAS and PVDF used.

In a practical adhering operation, a higher temperature can be used to shorten the operation time. In this case, the upper limit of this temperature is about 400° C.

The adhesive can be produced by mixing the components by using melt-blending apparatuses such as a screw-type extruder, a double kneading roller, a Weissenberg-type extruder, etc. The resin composition prepared by melt blending may be pressed or formed into a proper shape as an adhesive.

Incidentally, high-molecular weight resins such as PAS and PVDF have various molecular weight distributions, branching ratios, branch lengths, etc. even among the same types. With respect to PVDF copolymers, various combinations of monomers, composition ratios, branching, etc. exist, thereby providing them with different properties. In addition, PAS or PVDF articles to be adhered may contain reinforcing materials, fillers and other additives. All these variations are encompassed by the present invention.

With respect to the effects of the ultrafine particles on adhesion properties, various research has been reported, and in the present invention, they may be considered that the high-molecular weight resins (PAS and PVDF) are stabilized,,by the ultrafine particles in a mixed state. Specifically, since PAS and PVDF show poor compatibility, their mixed state is thermodynamically unstable when mixing is conducted mechanically. Accordingly, they tend to separate from each other in a molten state, and each high-molecular weight component gathers separately. Because of this tendency, when the temperature of the adhesive and the portions of articles to be adhered are too high, or when an adhesion time is too long, the separation of high-molecular weight polymers takes place, so that the entanglement of the PAS molecules and the PVDF molecules decreases, resulting in an extreme decrease in adhesion strength. As a result of experiments, it has been found that the addition of the ultrafine particles prevents the decrease of adhesion strength, thereby expanding a range of mixing ratio in which good adhesion is achieved.

For instance, in the case of no ultrafine particles contained, there is substantially no adhesion when the PVDF ratio is 50% (PVDF/PAS=1). However, when the ultrafine particles such as iron oxide powder (for instance, ferrite fine powder) having a particle size of 0.5 μm are carefully blended such that each resin component can contain substantially the same proportion of the ultrafine particles an adhesion strength of about 16 kg/cm$^2$ can be obtained at a filling ratio of 4%. Accordingly, a PVDF film can be laminated onto the PAS article by using this adhesive.

On the other hand, when the filling ratio of the ultrafine particles is too high, the adhesion strength is rather decreased, because of a decrease in strength of an adhesive layer and because of insufficient adhesion due to increase in the melt viscosity of the adhesive. Thus, the upper limit of the filling ratio of the ultrafine particles is about 30 volume %. The preferred filling ratio is 2-8 volume %.

The present invention will be explained in further detail by the following Examples

EXAMPLE

As resins for adhesives and articles to be adhered, "SOLEF" (manufactured by Solvay) was used as PVDF, and "Tohpren T-4" (manufactured by Tohpren Co., Ltd.) was used as polyphenylene sulfide (PPS). The ultrafine particles used was ferrite fine particles (KFA-NH, manufactured by Toda Kogyo K.K., γ-Fe$_2$O$_3$, average particle size: 0.5-0.6 μm).

The resin components were mixed by using a Weissenberg-type extruder to prepare an adhesive composition. The mixing of the components were conducted as follows:

First, while keeping the surface temperatures of a stationary disc and a rotary disc of the Weissenberg-type extruder at 320° C., and while keeping the gap between the rotary disc and the stationary disc at 2 mm, the rotary disc was rotated, and starting materials premixed in a solid state were supplied into the extruder from a hopper. Since the materials having different specific gravities and those having different sizes such as pellets and powder are generally not easy to mix uniformly, the components should be supplied little by little. Since the apparatus used in this experiment had a disc diameter of 12 cm and had a volume of about 10 cc, the resins were supplied in an amount of 5 cc, and a nozzle orifice was closed at the start of blending. After completion of mixing, the nozzle orifice was opened to conduct extrusion. To achieve a sufficient mixing, re-extrusion was conducted.

The resulting extrudate was heat-pressed to an adhesive sheet of 0.3 mm in thickness.

To prepare test pieces for evaluating adhesion strength, PVDF and PPS were formed into rods of 6 mm in diameter and 6-9 cm in length. To adhere the tip end surfaces of the PVDF rod and the PPS rod, a circular adhesive sheet of 5 mm in diameter was cut out from the above sheet. By using a heated metal plate having a flat, smooth surface and a thin polytetrafluoroethylene sheet, the circular adhesive sheet was fused onto the tip end surface of the PVDF rod. At this time, the surface temperature of the metal plate was 300°-330° C. Next, by using an air burner, the PVDF rod fused with the circular adhesive sheet on its tip end surface and the PPS rod were heated, and their tip end surfaces were brought into contact with each other in a molten state, and cooled in a contacted state.

To measure the adhesive strength, the bonded rods should be kept such that they extend substantially straight. In the measurement of the adhesion strength, Tensilon UTM 3 was used at a drawing speed of 4 mm/minute to measure a tensile strength, and the adhesion strength was determined by dividing the tensile strength by a section area of the test piece. In this measurement, the adhesion strength was determined assuming that the rod-adhesive layer interface was the weakest, and that there was no elongation in the adhesive layer. The adhesion strength was determined by averaging top 3 data among 5 data obtained from the adhered test pieces. The results of the adhesion strength measurement are as follows:

(1) FIG. 1 shows the relations between the adhesion strength and the PVDF ratio when the PVDF article and the PPS article were used as test pieces to be adhered and a resin composition of PVDF and PPS was used as an adhesive.

In FIG. 1, ○ represents a case where ultrafine particles are not contained, and ● represents a case where 3.85-4 volume % of ferrite fine particles are contained. The vertical axis shows a tensile adhesion (kg/cm$^2$) and the abscissa axis shows a PVDF ratio (PVDF/(PVDF+PPS)) by volume %.

(2) With respect to ultrafine particles other than ferrite fine particles, the same adhesion test was conducted. As a result, the following particles were found to be effective at a PVDF ratio of 50%:

pulverized glass beads (average particle size: 0.2 μm),
silica powder (average particle size: 0.5-2 μm),
nickel powder (average particle size: 0.3 μm),
nickel-iron alloy powder (average particle size: 0.3 μm), and
abrasive powder (average particle size: 1 μm or less).

(3) For comparison, a resin composition was produced as an adhesive from PVDF containing ferrite particles having an average particle size of 50 μm and PPS containing glass beads having an average particle size of 50 μm, and the same adhesion test was conducted on a combination of a PPS article and a PVDF article. As a result, good adhesion was not obtained.

As described above in detail, the adhesive resin composition of the present invention can adhere PAS and PVDF articles strongly, so that good laminated structures of PVDF and PAS can be obtained. Good adhesion can also be achieved on fiber-reinforced articles of PVDF and PAS.

By laminating PVDF having excellent chemical resistance, weathering resistance, slidability, electric properties, etc. onto PAS having high strength and elasticity even at a high temperature but poor in weathering resistance, PAS can be used outdoors.

In addition, the laminated structures of the present invention can be used for various applications including industrial materials, particularly structural materials and electronic materials.

What is claimed is:

1. A laminated structure comprising polyarylene sulfide, polyvinylidene fluoride and an adhesive disposed therebetween, the adhesive comprising polyarylene sulfide, polyvinylidene fluoride and ultrafine inorganic or metal particles having an average particle size of 0.01–1 μm, wherein said polyvinylidene fluoride consists essentially of the repeating unit of —CH$_2$—CF$_2$—, and has a melt index (230° C., 10 kg/cm$^2$, ASTM D 1238) of 1 to 100.

2. The laminated structure according to claim 1, wherein a volume ratio of said polyarylene sulfide to said polyvinylidene fluoride in the adhesive is 35:65–93:7, and a filling ratio of said ultrafine particles is 2 to 30 volume % per 100 volume % of the total composition of the adhesive.

3. A laminated structure comprising polyarylene sulfide, polyvinylidene fluoride and an adhesive disposed therebetween, the adhesive consisting essentially of polyarylene sulfide (PAS) and polyvinylidene fluoride (PVDF) in a PAS/PVDF ratio of 5 to 35 volume.

4. A method of adhering a polyarylene sulfide article and a polyvinylidene fluoride article comprising the steps of:

providing a resin composition as an adhesive comprising polyarylene sulfide, a polyvinylidene fluoride and ultrafine inorganic or metal particles having an average particle size of 0.01–1 μm, wherein said polyvinylidene fluoride consists essentially of the repeating unit of —CH$_2$—CF$_2$—, and has a melt index (230° C., 10 kg/cm$^2$, ASTM D 1238) of 1 to 100;

melting a portion of the polyarylene sulfide article, a portion of the polyvinylidene sulfide article and the adhesive, at a temperature between the melting point of the polyarylene sulfide and 100° C.;

interposing the molten adhesive between the molten portions of the respective polyarylene sulfide article and polyvinylidene fluoride article, whereby a bond is formed; and cooling the bond.

5. A method of adhering a polyarylene sulfide article and a polyvinylidene fluoride article comprising the steps of:

providing a resin composition as an adhesive consisting essentially of polyarylene sulfide (PAS) and polyvinylidene fluoride (PVDF) in a PAS/PVDF ratio of 5 to 35 volume %;

melting a portion of the polyarylene sulfide article, a portion of the polyvinylidene fluoride article and the adhesive, at a temperature between the melting point of the polyarylene sulfide and 400° C.;

interposing the molten adhesive between the molten portions of the respective polyarylene sulfide article and polyvinylidene fluoride article, whereby a bond is formed; and cooling the bond.

* * * * *